Oct. 11, 1960

G. W. COLBY 2,955,713

FILTER ELEMENT SEALING CONSTRUCTION

Filed June 30, 1954

INVENTOR
Gerald W. Colby
BY C. H. Dibble
ATTORNEY

United States Patent Office 2,955,713
Patented Oct. 11, 1960

2,955,713

FILTER ELEMENT SEALING CONSTRUCTION

Gerald W. Colby, Flint, Mich., assignor to General Motors Corporation, Detroit, Mich., a corporation of Delaware Filed June 30, 1954, Ser. No. 440,507

1 Claim. (Cl. 210—450)

This invention relates to filters for liquids and more particularly to filter elements which may be placed and replaced in casings for enclosing and connecting the same into a circulatory system, these elements being provided for the purpose of cleaning fluids such as lubricating oils and each element being provided with sealing means for constraining the passage of fluid to make that element effective.

Filtering elements for treatment of lubricating oils generally include a body of porous filtering material confined between coaxial tubular members and end plates joining the tubular members. The tubular members are made of perforated material and the end plates are made of impervious material so that fluid to be treated is guided through the body of filtering material after being introduced within the inner tubular member. To insure passage of the fluid through the filtering material, the end plates must be joined in fluid tight relation with the customary casing provided for holding the filter element in a system conveying the fluid.

Sealing gaskets have heretofore been located around apertures in the end plates to engage the filter casing so that the fluid is definitely led through the filter element without bypassing the latter. Difficulties of manufacture, particularly when associated with assembly line operation, have been encountered in satisfactorily joining the sealing gaskets to the end plates.

An object of this invention is to provide a filter element with an improved arrangement for retaining a sealing gasket on an end plate.

A feature of the invention is an annular flange defining a fluid flow aperture in a filter end plate, the flange having outwardly extending projections for retaining a sealing gasket. Another feature of the invention is a flange having outwardly extending tabs directed toward an end plate for holding a sealing gasket in engagement with the latter.

These and other features of the invention will now be described in detail in the specification and then pointed out more particularly in the appended claim.

Figure 1:
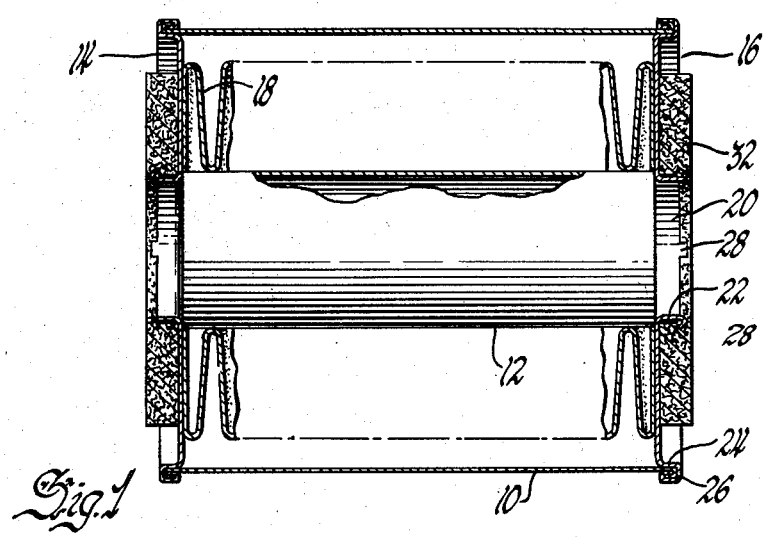
Fig. 1 is a sectional view of a filter element embodying the present invention.

The filter element comprises two concentric and perforated tubular members 10 and 12 joined by means of two discs or end plates 14 and 16. The end plates connect the concentric members 10 and 12 suitably to enclose a filtering material 18 which may be pleated or of an accordion type formed of sheet porous material or it may consist of a cylinder of cotton batting or equivalent porous material. It is to be understood that the present invention is not concerned with the nature or specific form of the body of porous material 18 as a number of expedients, well-known in the field concerned, may be employed without departing from the spirit of the present invention.

The end plates 14 and 16 are identical in structure and, for this reason, description herein will be confined to plate 16. It will be noted that plate 16 is provided with a central aperture 20 defined by an outwardly directed flange 22 integral with the plate. The outer margin of the end plate 16 is so formed as to constitute a cylindrical portion 24 which will fit within the outer perforated member 10. A double-over portion 26 cooperates with the cylindrical portion 24 to retain the end margin of the member 10 in fluid tight relation.

Figure 2:
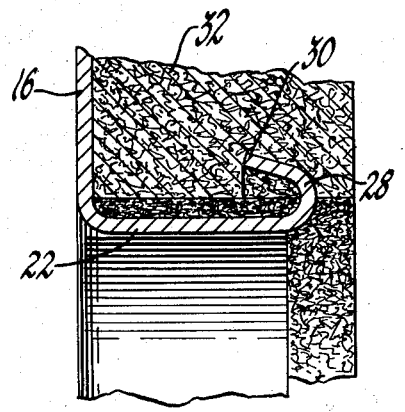
Fig. 2 is an enlarged sectional and fragmentary view of a structural detail shown in Fig. 1.
Figure 3:
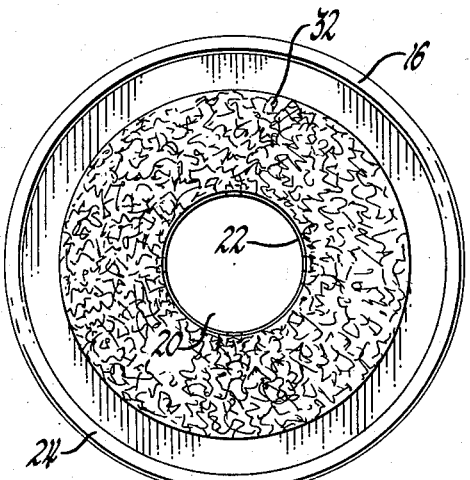
Fig. 3 is an end view of the filter element shown in Fig. 1.
Figure 4:
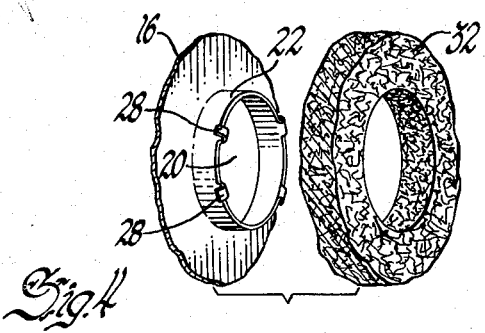
Fig. 4 is an exploded and perspective view of sealing elements shown in the assembly of Figs. 1, 2 and 3.

Integral with the flange 22 are spaced tabs 28, each of which is arcuate in form as best seen in Fig. 2 with its free end 30 directed towards the plate 16. The drawings depict four of such tabs for each end plate, but a larger or smaller number could be used if desired and dependent upon the size and use of the filter element being manufactured.

A resilient sealing gasket 32 of annular form and having a rectangular cross section is made in such proportions that it may be forced over the tabs 28 and against the outer surface of the plate 16. The tabs 28 become imbedded in the resilient gasket material and the inclination of the tabs prevents the gasket from becoming loose upon the assembly.

Use of this type of sealing construction enables the filter element 18 located inside of the unit assembly to be heat sealed to the end plate before the gasket is attached. The construction also eliminates the requirement of gluing the gasket to the end plate which is a costly process.

The resilient characteristic of the gasket material is taken advantage of as a means for avoiding use of adhesive and, as a result, the gasket is so firmly attached that it may be removed from the end plate only by tearing or extremely distorting the gasket.

I claim:

A filter element including porous filtering material confined between two end plates of impervious material, at least one of said end plates being of thin metal having a main body with a central aperture formed therein and adapted to serve as a passage for fluid, a flat sealing gasket of resilient material surrounding said aperture and contacting the exterior face of said main body near said aperture, projections in the form of spaced tabs integrally joined to the said main body adjacent to said aperture, each of said tabs being confined within the thickness dimension of said gasket and having an end of said thin metal extending toward said main body and into said gasket as a retaining means for the latter, and the arrangement being such that said gasket conceals said end.

References Cited in the file of this patent

UNITED STATES PATENTS

| 1,557,125 | Wiehn | Oct. 13, 1925 |
| 2,131,509 | Goepel et al. | Sept. 27, 1938 |
| 2,183,877 | Wilkinson et al. | Dec. 19, 1939 |
| 2,201,418 | Williams et al. | May 21, 1940 |
| 2,294,262 | Wilkinson | Aug. 25, 1942 |
| 2,468,862 | Briggs | May 3, 1949 |
| 2,550,070 | La Brecque et al. | Apr. 24, 1951 |
| 2,578,020 | Sandberg | Dec. 11, 1951 |
| 2,732,077 | Robinson | Jan. 24, 1956 |